ELECTRONIC COUNTER

FIG. I

INVENTORS
HAROLD D. ROSS JR.
CLARENCE E. FRIZZELL
BY A. J. Etienne
ATTORNEY

ELECTRONIC COUNTER

Filed July 21, 1952

INVENTORS
HAROLD D. ROSS JR.
CLARENCE E. FRIZZELL
BY A. J. Etienne
ATTORNEY

ELECTRONIC COUNTER

Filed July 21, 1952 6 Sheets-Sheet 3

INVENTORS
HAROLD D. ROSS JR.
CLARENCE E. FRIZZELL
BY A. J. Etienne
ATTORNEY

ELECTRONIC COUNTER

Filed July 21, 1952 6 Sheets-Sheet 4

INVENTORS
HAROLD D. ROSS JR.
CLARENCE E. FRIZZELL
BY A. J. Etienne
ATTORNEY

Feb. 14, 1956 H. D. ROSS, JR., ET AL 2,734,684

ELECTRONIC COUNTER

Filed July 21, 1952 6 Sheets-Sheet 5

INVENTOR
HAROLD D. ROSS JR.
CLARENCE E. FRIZZELL
BY A. J. Etienne
ATTORNEY

INVENTORS
HAROLD D. ROSS JR.
CLARENCE E. FRIZZELL
BY A. J. Etienne
ATTORNEY 2,734,684

ELECTRONIC COUNTER

Harold D. Ross, Jr., and Clarence E. Frizzell, Poughkeepsie, N. Y., assignors to International Business Machines Corporation, New York, N. Y., a corporation of New York Application July 21, 1952, Serial No. 300,084

9 Claims. (Cl. 235—92)

The present invention relates to storage means including electronic counters and more particularly to such counters comprising cascade connected electronic triggers, each operable to either one of two sustained conditions of equilibrium, whereby permutations of said two conditions assumed by said triggers are each respectively indicative of an entered value.

In the operation of such cascaded triggers, a pulse applied to the first trigger of the cascade operates this trigger to one condition of stability which may be called the "on" condition. A second pulse applied to this same trigger flips this trigger to a condition which may be called its "off" condition whereupon a pulse is emitted by this trigger to operate the next trigger in the cascade. Thus each trigger of the cascade must have two pulses applied to it before it can operate its next succeeding trigger.

Assuming, for example, as a simplified case, that three triggers are connected in cascade and that they have assumed a permutation of "on" and "off" conditions in which the first two triggers are "on" and the third is "off," a pulse applied to the first trigger flips it "off" so that it in turn flips the second trigger "off" which in turn flips the third trigger "on." This rippling of a pulse through the first two triggers is the most time-consuming condition of operation and at the extremely high rate of operation required by present day computing devices such a rippling operation may require so long a period of time that it slows down the overall operation of the computer.

To avoid such a slowing down, the rippling operation in a counter of cascaded triggers as just described, may be circumvented so that under certain conditions when it is required, in the example above, to flip the third trigger of a cascade "on" when it is "off," and the first two triggers in the cascade are "on," novel means may be provided so that a pulse applied to the first trigger does not have to flip the first trigger to in turn flip the second trigger which in turn finally flips the third trigger "on" but these novel means are operated when the first trigger flips "off," and are so connected as to directly flip the third trigger "on." Such a counter may be defined as a ripple circumventing counter since the pulse applied to the first trigger does not have to ripple down through a plurality of cascaded triggers, in order to operate a subsequent trigger.

One of the objects of the present invention, therefore, is to provide a ripple circumventing counter in which a third trigger, for example, may be operated, upon operation of the first trigger, without waiting for a pulse to ripple down through the first and second triggers; since novel means are provided, effective upon flipping of the first trigger, to directly flip the third trigger, without ever hindering the normal cascade operation of the first two triggers and also without operating the third trigger unnecessarily.

Another object is to provide a ripple circumventing counter in which "and" circuits comprising diodes are employed in conjunction with triggers comprising said counter, said "and" circuits and said triggers being so interconnected into networks that the number of ripples decreases, as the number of diodes, so connected, increases in number.

While the device of the present invention is disclosed as applied to a pure binary counter, it obviously may be applied to binary coded counters.

Other objects of the invention will be pointed out in the following description and claims and illustrated in the accompanying drawings, which disclose, by way of examples, the principle of the invention and the best mode, which has been contemplated, of applying that principle.

Figure 1:
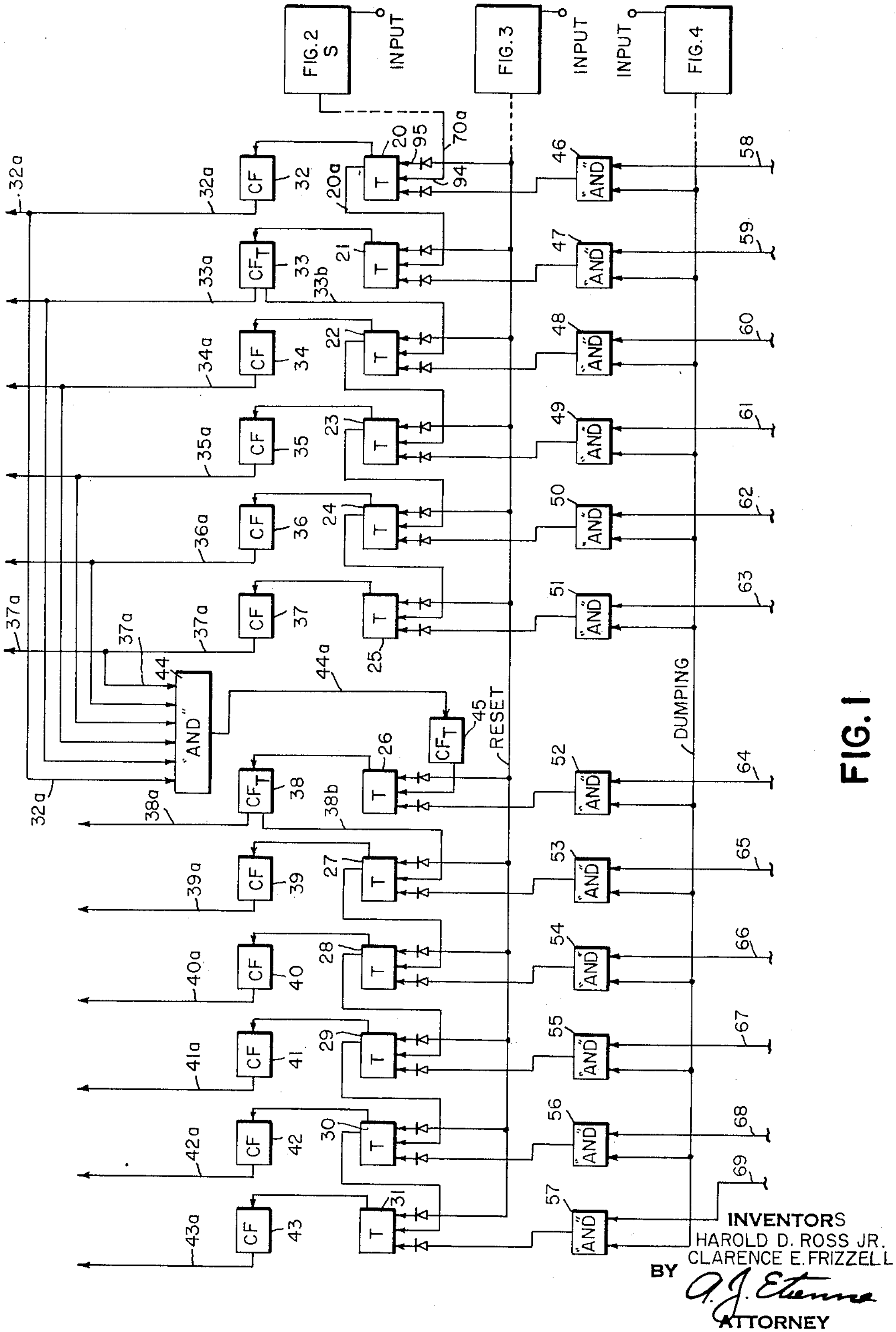
Fig. 1 is a block diagram of a complete storage device incorporating the novel ripple-circumventing counter of the invention.

Referring to the drawings and more particularly to Fig. 1, the novel storage means comprising a ripple-circumventing counter and the means for parallel dumping a registration into said counter and output circuits for each of the triggers, per se, are illustrated.

Figure 6:
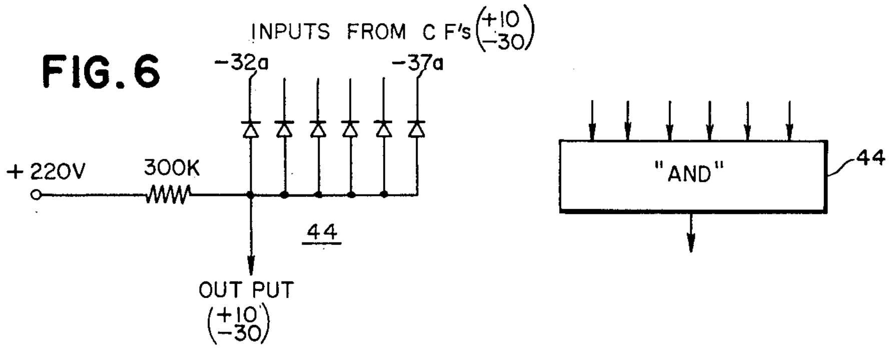
Fig. 6 is a wiring diagram illustrating the details of a 6 diode major "and" circuit employed in Fig. 1, and also its block symbol.

The counter, per se, comprises a plurality of trigger elements 20 to 31, inclusive, each of which comprises a circuit, such as is illustrated in detail in Fig. 8, to be described later. As is now well known, each trigger can assume either one of two conditions of stability, one of which may be called the "on" condition and the other the "off" condition. The "off" condition is herein assumed to be that condition in which the right hand triode (Fig. 8) of the trigger is conducting as indicated by the small circle at the right in Fig. 8 (hence the left hand triode is non-conducting) so that the plate voltage of the right triode is relatively low. The "on" condition is assumed to be that in which the right hand triode is non-conducting, in which condition its plate voltage is relatively high. Each of the triggers 20–31, inclusive, is connected to one of the cathode follower circuits 32–43, inclusive, respectively, each such cathode follower circuit comprising for example, a circuit as shown in detail in Fig. 7. Each of said triggers is connected at its right side full plate connection to the cathode follower input, as labeled in Figs. 8 and 7, respectively. Each of the cathode followers has a normal output, which in the case of cathode followers 32 to 37, inclusive, comprises lines 32_a_ to 37_a_, respectively, each of which is connected to the major "and" circuit 44, whose circuit details are shown in Fig. 6, the output lines of each cathode follower being connected to one of the inputs, as labeled in Fig. 6. Each of the cathode followers 32–43, inclusive, has an associated output line, labeled 32_a_–43_a_, inclusive, which may provide the output to another storage device which may or may not be similar to the one as disclosed in Fig. 1.

Figure 7:
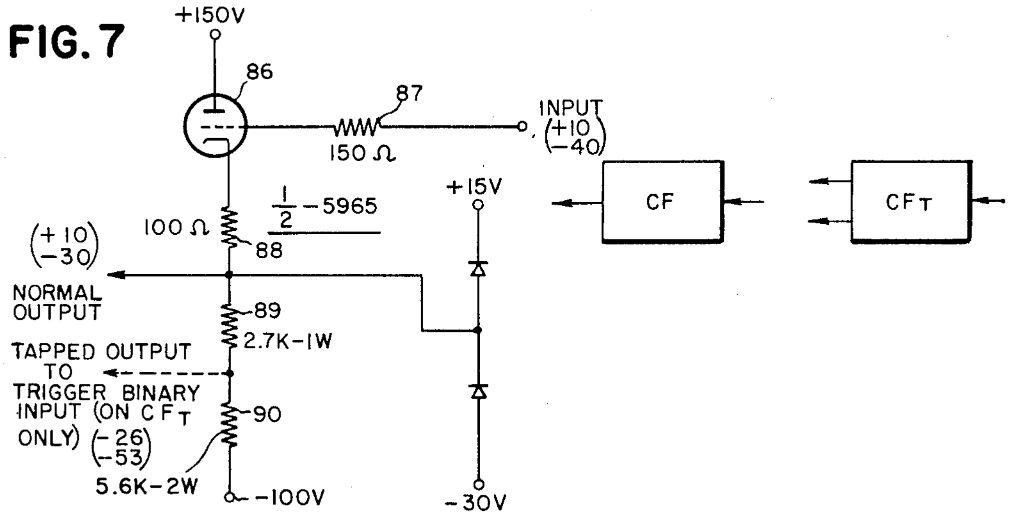
Fig. 7 is a wiring diagram illustrating the details of a cathode follower as employed in the device of Fig. 1, including the details of a tapped cathode follower, and the block symbols thereof.
Figures 8, 9:
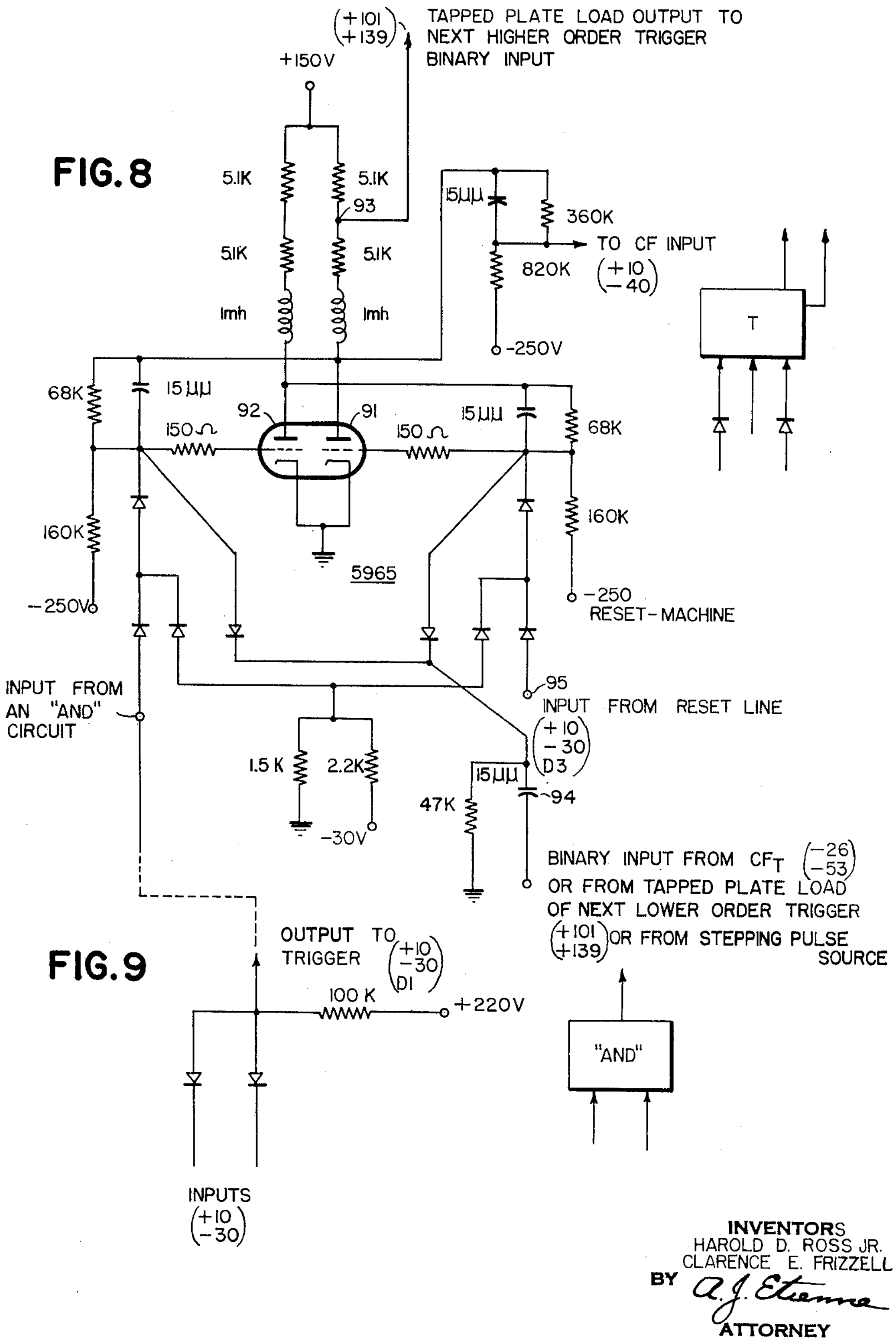
Fig. 8 is a wiring diagram of the circuit details of each of the trigger circuits employed in Fig. 1, and also its block symbol.
Fig. 9 is a wiring diagram illustrating the circuit details of a simple two diode "and" circuit of the type employed to control parallel dumping of a value into the device of Fig. 1, and also its block symbol.

With regard to the cathode followers 33 and 38, each of these comprises a tapped cathode follower, having a tapped output, as labeled in Fig. 7, which via lines 33_b_ and 38_b_, respectively, lead to the binary input of the next succeeding trigger, as labeled in Fig. 8. This tapped output is rendered operative when a preceding trigger flips "off" to thereby flip the next trigger one way or the other. For example, the cathode follower 33 is effective, when the trigger 21 is flipped "off," to transmit a negative pulse via line 33_b_ to the binary input of trigger 22 to thereby flip this trigger one way or the other. Similarly, the tapped cathode follower 38 and line 38_b_ are employed between the triggers 26 and 27. These tapped cathode followers were employed because of certain physical assemblies of the circuits of instant device which assemblies require cathode follower coupling between them.

The cathode follower tapped output has an amplitude similar to that of a trigger tapped output.

Figure 2:
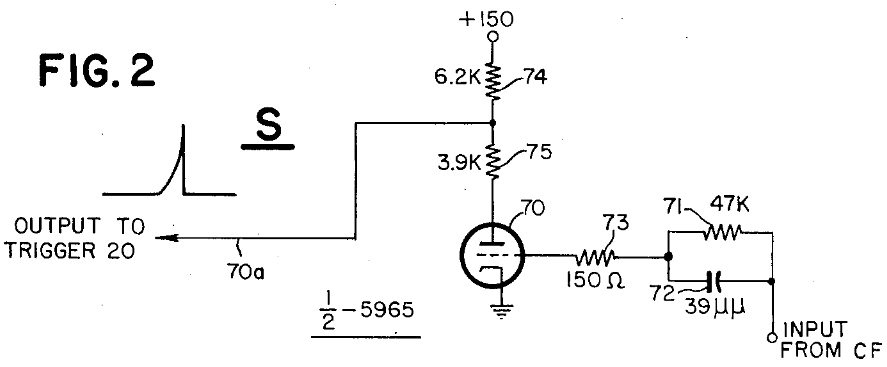
Fig. 2 is a detailed circuit diagram of the means for providing a pulse input to the counter of Fig. 1.

The triggers 20 to 25, inclusive, are connected in cascade, triggers 20 and 21 being connected directly in cascade, 21 and 22 being connected in cascade by means of the tapped cathode follower 33 and triggers 22 to 25, inclusive, being directly connected in cascade, as shown. The input to the counter comprises a source of pulses labeled S, whose circuit details are illustrated in Fig. 2 and will be described presently. This provides a source of pulses of the shape illustrated in Fig. 2, to flip trigger 20 "on" and "off," alternately, trigger 20, when flipped off," producing a pulse which is applied, from its tapped plate output (see Fig. 8) via line 20_a_, to the binary input (see Fig. 8) of trigger 21 to thereby flip trigger 21 "on," assuming it was reset "off," all in the now well known manner.

Successive pulses applied to the input trigger 20 will flip the triggers 20–25, inclusive, into different permutations of "on" and "off," each permutation selectively representative of the number of pulses applied to the trigger 20, which is the input of the counter, per se.

When all of the triggers 20–25, inclusive, are "on," the plate voltages of the right hand triodes are relatively plus since the right hand triodes (Fig. 8) are non-conducting and as labeled in Fig. 8 and illustrated in Fig. 1, this voltage is fed to the respective cathode follower input and via the normal output of the cathode follower to its connected output line and thus to the cathode sides of the six diodes comprising the "and" or coincident circuit 44. Since a relatively plus voltage is thus applied to all of the cathodes of the six diodes of this "and" circuit, and since, as shown in Fig. 6, a +220 v. is applied to the plates of each of the diodes via a 300 k. resistor, the output of the main "and" circuit 44 will therefore be plus. As is now well known in the art, such a plus output, applied via line 44_a_ (Fig. 1) and the tapped cathode follower 45 to the input of trigger 26, has no effect on this trigger, its binary input being capacity coupled, as illustrated at 94 in Fig. 8, and this binary input being responsive to relatively negative pulses only. However, the very next pulse applied to the input of trigger 20 will flip this trigger "off" which thus removes the relatively positive potential from one diode of the main "and" circuit 44 so that a relatively negative pulse is now available at its output, which is fed via the line 44_a_ and the tapped cathode follower 45 to the binary input of the trigger 26, to flip this trigger "on," it being assumed that the trigger was initially in the "off" condition.

This it is seen that with triggers 20, 21, 22, 23, 24 and 25 all "on," a pulse, applied to the trigger 20, does not have to ripple through these triggers in order to flip the next trigger 26, which would be the normal sequence of operation in a counter of this type but instead, immediately upon flipping "off" of trigger 20, a negative pulse is effective, via the cathode follower 32, line 32_a_ the main "and" circuit 44, line 44_a_ and the tapped cathode follower 45, to the binary input of trigger 26, to immediately flip it "on."

Assuming a condition, in which each of the triggers 20–31, inclusive, is "on," a pulse subsequently applied to the trigger 21 will not be forced to ripple down through triggers 20–25, inclusive, in order to flip the trigger 26 and its succeeding triggers, but is immediately available, by the circuit described above, to flip this trigger 26 and the longest ripple which ensues will be that through trigger 20 and through the triggers 26, 27, 28, 29, 30 and 31 in cascade. Simultaneously a ripple takes place through triggers 21 to 25, inclusive, due to the negative going output of trigger 20 but this has no further effect. Thus the number of triggers through which the input pulse must ripple under the condition where triggers 20 to 31, inclusive, are all "on" has been reduced, from a normal of 12 to a total of only 7, so that the speed of operation of the counter has been nearly doubled.

Figure 5:
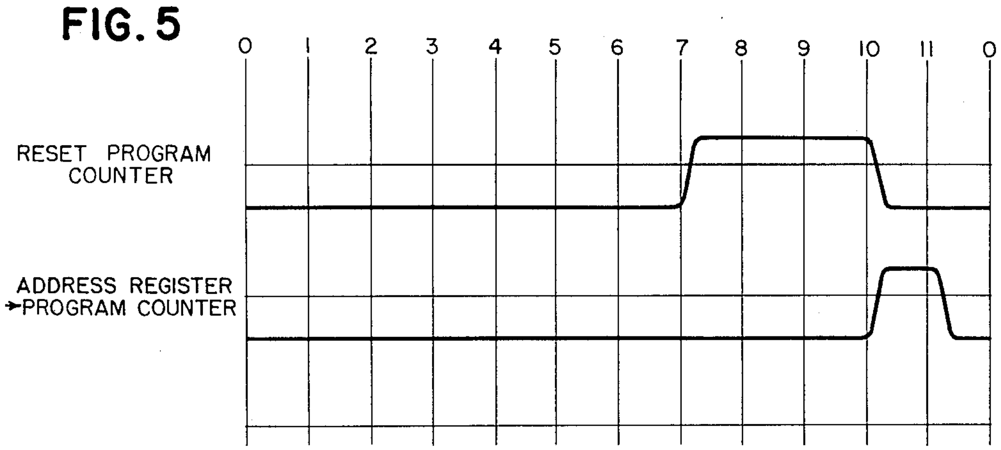
Fig. 5 is a timing diagram illustrating the relative timing of the reset and dumping control pulses for operation of the device of Fig. 1.

The novel storage means of Fig. 1 also includes a plurality of two-diode "and" circuits, 46 to 57, inclusive, each comprising the diode circuit, as shown in detail in Fig. 9. Assume the counter to have been reset by applying a positive pulse to the input of the circuit of Fig. 3 as described later. A relatively plus "dumping" pulse may be applied by the circuit of Fig. 4, whose wave shape is illustrated in Fig. 5 and labeled "Address Register" with an arrow pointing to "Program Counter." This is applied to one each of the left hand diodes of each of the two diode "and" circuits (Figs. 1 and 9) so that if a relatively plus voltage is applied via lines 58–69, respectively (Fig. 1) to the other diode of any two diode "and" circuit, a plus output is obtained, which is applied, directly to the grid of the left hand triode of the associated trigger (as illustrated in Figs. 9 and 8) which will thus pull over this trigger to its "on" condition, i. e. with the left hand side conducting. Each of the input lines 58 to 69, inclusive, respectively, is connected (not shown) to a full right triode plate output, for example, of a trigger of the type as shown in Fig. 8, in another storage device, which may or may not otherwise, be similar to that of Fig. 1. If this trigger in the other storage device is "on," so that its right plate is relatively positive, then the application of this positive voltage to the right hand diode, for example, as in Fig. 1, an "and" circuit connected to this input line, will render this "and" circuit effective to pull "on" the corresponding trigger of the storage device of Fig. 1. If the trigger in the other storage device is "off," so that its right plate is relatively negative, the application of this negative voltage to this diode of an "and" circuit connected to this input line will render the "and" circuit ineffective to pull "on" the corresponding trigger of the storage device of Fig. 1. Thus, the respective permutations of "on" and "off" conditions of one storage device may be dumped or transferred to the storage device of Fig. 1 to reproduce in this storage device the same permutation of "on" and "off" as existed in the other. Having set up this permutation in the device of Fig. 1, this registration may then be stepped along, as desired, by pulses applied to the input trigger 20, or on the other hand, this permutation may be retained in the device of Fig. 1 and via the output lines 32a to 43a, inclusive, be applied to still another storage device by means of double diode "and" circuits, of the type illustrated in Fig. 1 and shown in Fig. 9.

It is believed that the general operation of the novel storage device of Fig. 1 will now be clear. The details of the respective circuits of each of the types of elements employed in the construction of this novel device will now be described.

Referring to Fig. 2, there is shown therein the details of the circuit labeled S in Fig. 1 which comprises a source of input pulses for stepping the counter of Fig. 1. This circuit comprises a triode 70 which may, for example, comprise one half of a dual triode of the type 5965. The input to the grid of the triode 70 may be received from a cathode follower, as labeled in Fig. 2, and is fed via a 47K resistor 71 and a 39 micromicrofarad condenser 72, in parallel therewith, through a 150 ohm resistor 73 to the grid of triode 70, the output of this triode being taken from a tap between a 6.2K resistor 74 connected to a source of +150 v. and a 3.9K resistor 75, in series therewith, connected to the plate of triode 70 and is fed via line 70a to the binary input (see Figs. 8 and 1) of trigger 20. Thus, pulses of shape illustrated in Fig. 2 are applied to the trigger 20 (Fig. 1) to step the cascade of triggers along, as described above.

Figures 3, 4:
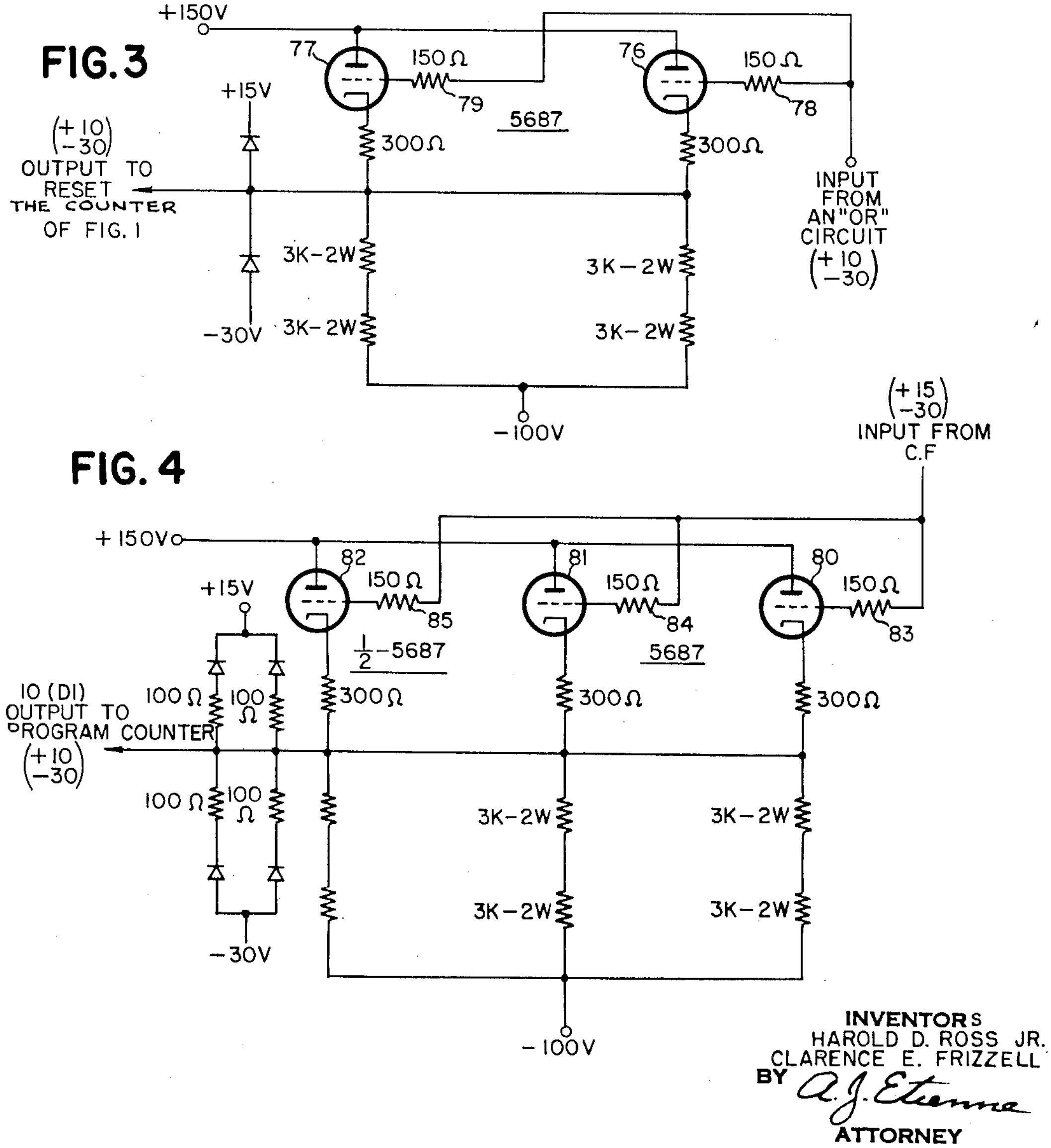
Fig. 3 is a detailed circuit diagram of the reset circuit for resetting the counter of Fig. 1.
Fig. 4 is a detailed circuit diagram of the dumping control circuit for controlling parallel dumping of a registration into the storage device of Fig. 1.

Referring to Fig. 3, there is shown in detail the circuit for producing Reset of each of the triggers 20–31 of Fig. 1 which renders the right triodes (Fig. 8) conductive, by applying a pulse of the shape and duration, as illustrated in Fig. 5 and labeled Reset Program Counter. This positive pulse is applied to the input 95 of each of the triggers, as indicated by the label "Input from Reset Line" in Fig. 8. This positive pulse is applied directly to the grid of the right hand triode of each of the triggers to thus pull the trigger "off," that is, with the right hand triode conducting as indicated by the small circle to the right of tube 91 in Fig. 8.

In Fig. 3, the input to the triodes 76 and 77, which may each comprise one-half of a type 5687 is applied via the respective 150 ohm resistors 78 and 79 to the respective grids of triodes 76 and 77. An output, supplied with protective diodes having +15 v. and −30 v. applied thereto as illustrated is taken from the cathode tap of each triode, between its 300 ohm cathode resistor and the 3K–2W resistor as shown connected in series with a second 3K–2W resistor to a source of −100 volts. Thus 40 v. amplitude pulse of 3 microseconds duration may be applied to the Reset input of each of the triggers (Fig. 8) to reset each of the triggers of the counter (Fig. 1) to the "off" condition.

Referring to Fig. 4, the details of the dumping control circuit for applying a "dumping" pulse to one each of the two diodes of each of the "and" circuits 46–57, inclusive (Fig. 1) is illustrated in detail. The output of this circuit is diagrammatically illustrated in Fig. 5 and is labeled "Address Register" with an arrow pointing to "Program Counter." This arrow indicates that the registration of an Address Register, whose trigger outputs are respectively applied to lines 58–69, inclusive, as stated above, are to be dumped into the device of Fig. 1 said device having been previously reset, so that the permutation of "on" and "off" conditions of the Address Register will be reproduced in the triggers 20–31, inclusive, of the device of Fig. 1. The timing of this dumping pulse with respect to the reset pulse is illustrated in Fig. 5.

Referring to Fig. 4, the triodes 80, 81 and 82 may again comprise the respective halves of types 5687 and are each controlled by an input from a cathode follower, as labeled in Fig. 4, which input is applied via the respective 150 ohm resistors 83, 84 and 85 to the grids of the tubes 80, 81 and 82, respectively, whereby an output is obtained from the cathode follower tap between the respective 300 ohm resistors and the first of two 3K–2W resistors in series, connected to a source of −100 v. from which output supplied with protective diodes, as shown, a positive pulse, as illustrated in Fig. 5, of 40 v. amplitude is applied via the output to the program counter, to the left one of the diodes of each of the "and" circuits 46–57, inclusive of Fig. 1 upon application of +15 v. to the input of the device of Fig. 4. Those of the lines 58–69, inclusive, respectively, which are positive, will, upon application of this "dumping" pulse, produce a plus output in a corresponding "and" circuit to thus pull the corresponding trigger of the counter of Fig. 1, "on," whereby the registration of the Address Register is dumped via lines 58–69 and the "and" circuits 46–57, inclusive, into the triggers 20–31, inclusive, of the device of Fig. 1.

Referring to Fig. 6 there is shown in detail the circuit of the main "and" or "coincidence" circuit 44 of Fig. 1. This comprises six diodes each of which may comprise a crystal diode of the type Sylvania D436A these six diodes being connected in parallel, as shown, with the plates of all six connected, via a common 300K resistor to a source of +220 v. When all of the six diode cathodes have a plus potential of +10 applied thereto, a +10 v. output is available at the "output" of the "and" circuit 44, as indicated. However, when any one of the potentials applied to the cathodes of the six diodes drops to −30 v. as will occur when any one of the triggers 20–25, inclusive, is flipped "off," subsequent to that condition in which all of these triggers are "on," then a −30 v. is available at the "output" of the main "and" circuit 44, which is applied (Fig. 1) via line 44a to the input of the tapped cathode follower 45 which produces a tapped output of −53 v. (see Fig. 7) which when applied to the binary input of trigger 26 will flip this trigger, by way of its condenser coupled binary input (see Fig. 8) in the well known manner, so that the right hand triode will now be non-conducting, if this trigger were previously reset "off." This "and" circuit 44 is illustrated symbolically in both Figs. 1 and 6 while the circuit details encompassed by the block are illustrated in Fig. 6.

Referring to Fig. 7, there is illustrated therein both the block diagrams of the cathode follower and of the tapped cathode follower and the detailed circuit of each. Each cathode follower comprises a triode 86 which may comprise one half of a type 5965 dual triode. An input voltage of +10 or −40 v. is applied via a 150 ohm resistor 87 to the grid of triode 86 whereby a normal output voltage of +10 is obtained at the junction of a 100 ohm cathode resistor 88 and a 2.7K–1W resistor 89 upon application of +10 to the input, while a normal output of −30 v. is obtained, upon application of −40 v. to the input. Clamping devices as shown ensure that the −30 v. output level is obtained and also serve to prevent excessive voltage excursions of the output line when turning the supply voltages "on" and "off." As indicated by the dash line, a tapped output may be employed by tapping the junction of the 2.7K–1W cathode resistor 89 which is in series with a 5.6K–2W cathode resistor 90 connected to a source of −100 v. This tapped output is employed, in addition to the normal output, in each of those particular cathode followers of Fig. 1 which are represented by the tapped cathode follower symbol.

Referring to Fig. 9, the details and block diagram of a two diode "and" circuit as shown by 46–57, inclusive, in Fig. 1, is illustrated. This "and" circuit comprises two diodes only, instead of the six diodes as used in the main "and" circuit 44 of Fig. 6, the plates of these two diodes being joined, as shown and connected by means of a 100K resistor to a +220 v. source. With an input of +10 v. applied to both of the cathodes of the two diodes, a +10 v. output is obtained, while if either of the inputs is changed to a −30 v., the output of this simple "and" circuit falls to −30 v., as indicated in Fig. 9. This output is connected, as indicated by the dash line between Fig. 9 and Fig. 8, to the input of the left hand triode of the corresponding trigger.

Referring to Fig. 8, there is illustrated therein the details and the symbolic representation of each of the trigger circuits 20–31, inclusive, of Fig. 1. Each such trigger comprises a pair of cross-coupled triodes 91 and 92 which together may comprise a dual triode of the type 5965. The plate of triode 92 is coupled by a 15 micromicrofarad condenser and a 68K resistor, in parallel therewith, and via a 150 ohm resistor, to the grid of triode 91 while the plate of triode 91 is similarly connected to the grid of triode 92. Each plate is connected by a 1 millihenry inductance and two 5.1K resistors, in series, to a +150 v. source, the plate circuit of diode 91 being tapped at 93 between the two 5.1K resistors which, tapped plate load output, as labeled, will feed to the next higher order trigger binary input. When triode 91 is reset conductive or when the trigger is flipped so that triode 91 is conductive, a relatively negative voltage of +101 v. is fed to the binary input of the next higher trigger, which input comprises a 15 micromicrofarad condenser 94, as labeled in Fig. 8, to thus flip this next trigger "on" or "off," as the instant trigger flips "off." This operation of the trigger is in the well known manner, in which a relatively negative pulse so applied to the condenser coupled binary input will flip the trigger either "on" or "off," the "on" condition, as stated above, being with triode 91 non-conducting, and its plate tap at +139 volts, while the "off" condition is wtih triode 91 conducting and its plate tap at +101 v. As stated above, this trigger may be reset "off" by a plus voltage applied to Reset Input 95 and thus via two diodes, as shown, and a 150 ohm resistor conductively to the grid of the right hand triode, as indicated by the label in Fig. 8 to thus pull the trigger "off" by rendering triode 91 conductive. This voltage wave form is shown in Fig. 5, and labeled "Reset Program Counter," whereby the trigger is thus pulled "off," by rendering the right hand triode conducting.

While various specific values and types have been indicated, these are to be considered as illustrative only and are indicative of values found most suitable for the particular computer in which this storage device has been employed. Other values and types will readily suggest themselves to those skilled in the art. In the various figures, diodes of the type as shown and described with regard to Fig. 7, are employed, these serving to prevent excessive voltage excursions of the output lines when turning supply voltages "on" or "off"; which excessive excursions would otherwise tend to damage the diodes connected to the output lines.

Figure 10:
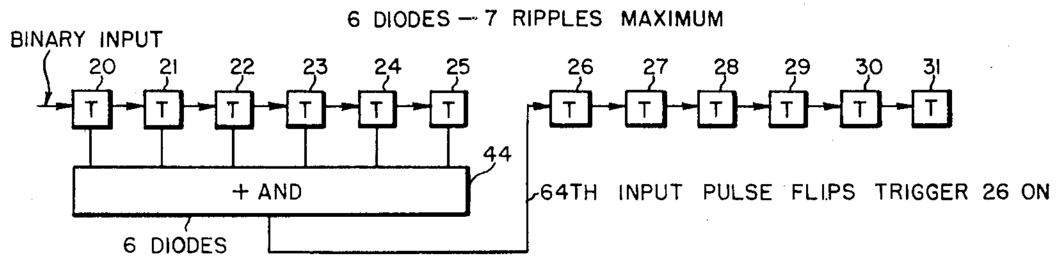
Fig. 10 is a block diagram illustrating the embodiment of Fig. 1.

There has been described in detail the circuits and operation of a novel ripple circumventing counter employed in a storage device of the invention. The novel counter, per se, of Fig. 1 is illustrated symbolically in Fig. 10 which figure illustrates that embodiment of the invention as shown in Fig. 1. Various other embodiments will now be described utilizing solely the symbolized representation of the type of Fig. 10, which by comparison with Figures 11–14 will serve to highlight the respective differences among the different embodiments. As illustrated in Fig. 10, this embodiment comprises a first group of six cascade connected triggers which may comprise the triggers 20–25, inclusive, connected in cascade, as shown in Fig. 1, each of the triggers being connected to the main "and" circuit 44, as shown in Fig. 1, whereby each trigger, when "on," applies a portion of a "conditioning" potential to this main "and" circuit 44. The cathode followers of Fig. 1 are omitted in Fig. 10 and the succeeding figures for purposes of simplification and clarification. Upon application of 63 pulses to the chain of six triggers 20–25, inclusive, all of these triggers will be "on" so that the outputs of the triggers taken from the right hand triodes thereof, applies +10 v. to the cathodes of each of the six diodes of the main "and" circuit 44, as illustrated in Fig. 6. Thus the output from the "and" circuit 44 is +10 v. which will not flip the trigger 26. Upon application of the 64th pulse to the input trigger 20, a 40 v. negative shift is immediately available at the output of the "and" circuit 44 to thus flip the trigger 26 "on," it being assumed that all triggers were initially reset "off."

For each such negative shift from the output of "and" circuit 44, the chain of triggers 26–31 will be stepped along. With six triggers employed in each of the two groups of the cascade, as illustrated in Figs. 1 and 10, and with all 12 triggers "on," a maximum of 7 ripples only will occur on the next succeeding pulse applied to the input trigger 20. In more detail, with all 12 triggers "on," the next pulse applied to the input of trigger 20 will turn this trigger "off" and a negative-going output will be available immediately via "and" circuit 44 to flip the trigger 26 and will then ripple down through the triggers 26, 27, 28, 29, 30 and 31, in cascade. Meanwhile the negative-going output of trigger 20 will initiate a ripple down through triggers 21 to 25, inclusive. Thus a maximum of 7 ripples instead of the normal 12 will occur, so that the novel means of the present invention enable the operating speed, at this condition, to be approximately doubled.

Figure 11:
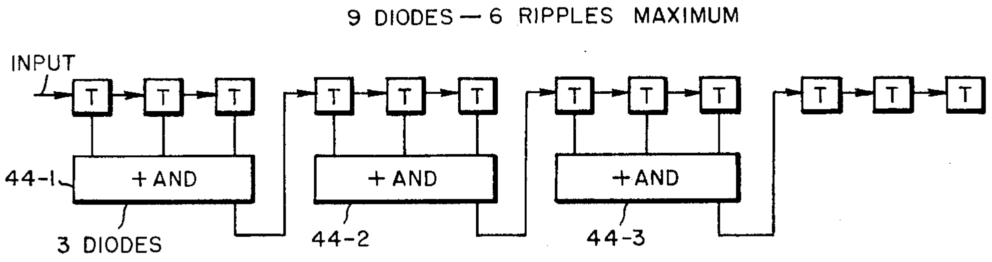
Fig. 11 is a block diagram of another embodiment of the novel ripple-circumventing counter.

Referring to Fig. 11, there is illustrated therein another embodiment comprising four groups of three triggers each, each of the first three groups, respectively, having a common "and" circuit with the output of the third "and" circuit feeding to the input trigger of the fourth group of three triggers in cascade.

In this embodiment the first 7 pulses applied to the input of the first group of three triggers, at the extreme left, will turn all of the triggers "on," so that the "and" circuit 44—1 controlled thereby has +10 v. applied to the three diodes comprising this "and" circuit, on the cathode side thereof, so that +10 v. is available at its output (see Fig. 9 for example). As is now well understood, this +10 v. output will not flip the first trigger of the second group of three triggers. However, the 8th pulse applied to the input trigger of the first group will immediately produce a shift from +10 v. to —30 v. from the "and" circuit 44—1, which is applied to the first trigger of the second group to flip this trigger "on," it being assumed that all triggers were initially reset "off." Each such negative shift output from the "and" circuit 44—1 will step the second group of three triggers along. After 56 pulses have been applied to the input of the first group, all three triggers of the second group will be "on" and the output of "and" circuit 44—2 will thus be +10 v. At the 64th pulse input to the counter, a +10 to —30 v. negative shift output is available immediately at the output of "and" circuit 44—2 to thus flip the first trigger of the 3rd group. Each such negative shift output, at the output of "and" circuit 44—2 will step the third group along. After the 448th input pulse has been applied to the counter, all three triggers of the third group will be "on" thereby conditioning the "and" circuit 44—3 so that its output is +10 v. Following the 512th input pulse to the counter, a negative shift output is obtained from the "and" circuit 44—3 which will thus flip the first trigger of the fourth group. For each such negative shift output from "and" circuit 44—3, the fourth group will be stepped along. Thus in the embodiment as illustrated in Fig. 11 comprising 9 diodes, with 3 diodes each employed in each of the "and" circuits 44—1, 44—2 and 44—3 respectively, and with all 12 triggers "on," a pulse applied to the input of the counter will turn off the first trigger of the first group of three triggers to produce a negative shift at the output of "and" circuit 44—1 which will then turn off the first trigger of the second group of triggers to produce a negative shift at the output of "and" circuit 44—2 which in turn will turn off the first trigger of the third group to produce a negative shift at the output of "and" circuit 44—3 which will then ripple through each of the three triggers of the fourth group. Thus in the embodiment of Fig. 11, when all triggers are "on," the time duration of six ripples only is needed to produce an output from the last trigger of the cascade. Turning off the first trigger in each group of three will cause ripple through to occur in their respective groups.

Figure 12:
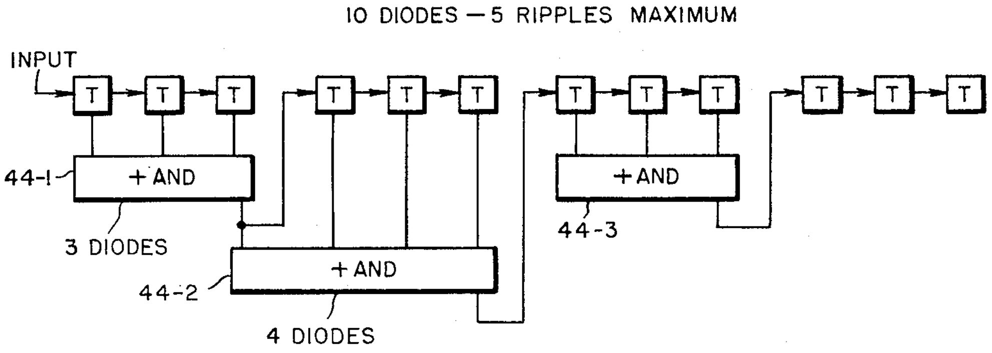
Fig. 12 is a block diagram of still another embodiment of the invention.

Referring to Fig. 12, this embodiment comprises four groups of three triggers each, the first group conditioning their common "and" circuit 44—1 whose output is connected to both the first trigger of the second group and also to one input of the four diode "and" circuit 44—2, whose other three diodes receive their inputs from the three triggers of the second group. The output of this "and" circuit 44—2 is connected only to the first trigger of the third group whose "and" circuit 44—3 is connected at its output to the first trigger of the fourth group.

In this embodiment, after 7 pulses have been applied to the counter input, all three triggers of the first group are "on," so that the output of "and" circuit 44—1 is +10 v. The 8th input pulse to the counter produces a negative shift at the output of "and" circuit 44—1, which flips the first trigger of the second group. After 56 pulses have been applied to the input of the counter, all three triggers of the second group are "on" and thus the three right hand inputs to "and" circuit 44—2 are at +10 volts. After the 63rd pulse has been applied to the input of the counter the three triggers of the first group are all "on" and the condition of the three triggers of the second group has not changed, so that the output of "and" circuit 44—1 is +10 v. and since the three right-hand inputs to the "and" circuit 44—2 are, as stated above, +10 v. respectively, the "and" circuit 44—2 is conditioned. When the 64th pulse is applied to the input of the counter a negative shift is produced at the output of "and" circuit 44—1 which de-conditions "and" circuit 44—2 producing a negative shift from its output to thus flip the first trigger of the third group.

After 48 pulses have been applied to the input of the counter all three triggers of the third group are "on" and the "and" circuit 44—3 is conditioned. Following the 512th input pulse to the counter, a negative shift output is obtained from the "and" circuit 44—3 to thus flip the first trigger of the fourth group.

Considering again when all of the triggers of all four groups are "on," a subsequent pulse applied to the counter input will turn off the first trigger of the first group and produce a negative shift output at both the output of "and" circuit 44—1 and at the output of "and" circuit 44—2 without waiting for this negative shift to turn off the first trigger of the second group. This negative shift will likewise turn off the first trigger of the third group and produce a negative shift at the output of the "and" circuit 44—3 which will then ripple through each of the three triggers of the fourth group. Thus in the embodiment of Fig. 12, employing 10 diodes in three "and" circuits, namely three in each of the two "and" circuits 44—1 and 44—3 and four in the "and" circuit 44—2, and with the circuit, as shown, the maximum number of ripples is cut to 5.

Figure 13:
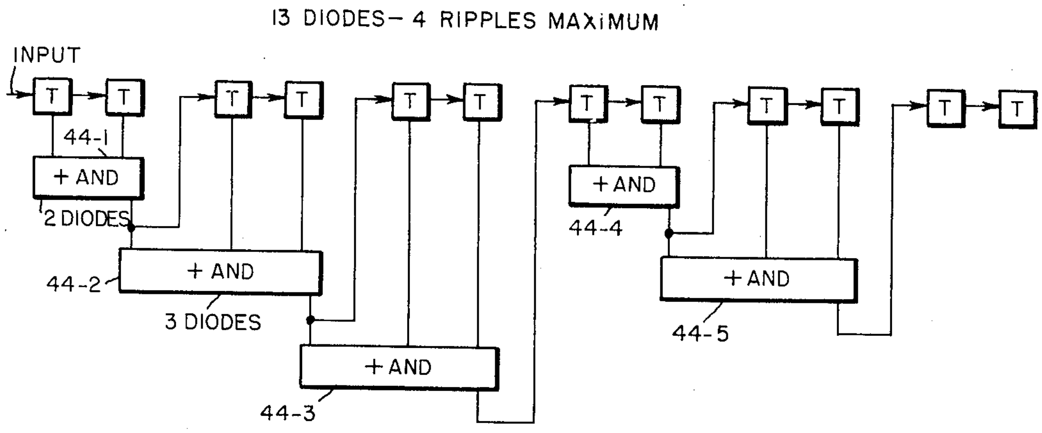
Fig. 13 is a block diagram of a further embodiment of the invention.

Referring to Fig. 13, this embodiment comprises six groups of two triggers each. The first two triggers, at the left, are connected to an "and" circuit 44—1 whose output is fed not only to the first trigger of the second group but is also the input to the left hand diode of the three diodes comprising "and" circuit 44—2, its two right hand diodes having their inputs supplied by the triggers of the second group. The output of "and" circuit 44—2 is fed not only to the first trigger of the third group but also to the left hand diode of the "and" circuit 44—3 whose other two diodes are controlled by the two triggers of the third group. The output of the "and" circuit 44—3 is connected only to the first trigger of the fourth group. The output of the "and" circuit 44—4 is connected not only to the first trigger of the fifth group but also comprises the input to the left hand diode of the "and" circuit 44—5 whose other two diodes are conditioned by the two triggers of the fifth group. The output of the "and" circuit 44—5 feeds only to the first trigger of group six. The operation is as follows:

After 3 pulses, the two triggers of the first group are "on" and condition the "and" circuit 44—1. At the 4th pulse input to the counter, a negative shift is available at the output of "and" circuit 44—1, to flip the first trigger of group 2. After 12 pulses have been fed to the counter, the two triggers of the second group are both "on," so that two of the three inputs of the "and" circuit 44—2 are at +10 v. At the 15th pulse fed to the counter both triggers of the first group are "on" and since the condition of the triggers of the second group has not changed, all three diodes of the "and" circuit 44—2 have +10 on their inputs and the "and" circuit 44—2 is conditioned. At the 16th pulse input to the counter, a negative shift is available at the output of "and" circuit 44—2, which flips the first trigger of the third group. After 48 pulses have been fed to the counter input, both triggers of the third group are "on" thus applying +10 v. to two of the three diodes of the "and" circuit 44—3. After 63 pulses are applied to the input of the counter, both triggers of the first group and of the second group are "on," and a +10 is applied to the third diode of "and" circuit 44—3 so that this "and" circuit is conditioned. At the 64th pulse, a negative shift is available at the output of "and" circuit 44—3 to flip the first trigger of the fourth group. After 192 pulses have been fed to the input, both triggers of the fourth group are "on" and the "and" circuit 44—4 is conditioned. At the 256th input pulse, a negative shift is available at the output of the "and" circuit 44—4 to flip the first trigger of the fifth group. At the 768th pulse input, both triggers of the fifth group are "on" to thus apply a +10 v. to each of the two right hand diodes of the "and" circuit 44—5. At the 960th pulse input, the two triggers of the fourth group and the two triggers of the fifth group are all "on" and the "and" circuit 44—5 is conditioned. At the 1024th pulse, a negative shift is available at the output of "and" circuit 44—5 to thus flip the first trigger of the 6th group.

Again, when all triggers of this embodiment are "on," a pulse applied to the counter input will turn off the first trigger of the first group and is available immediately via the "and" circuits 44—1, 44—2 and 44—3 to turn off the first trigger of the fourth group and is then immediately available via the "and" circuits 44—4 and 44—5, to ripple through the two triggers of the 6th group, so that a maximum time duration of 4 ripples is required to produce an output from the counter. Thus with 13 diodes employed in the five "and" circuits, in the manner as illustrated in Fig. 13, the counter ripple operation requires only a time duration of 4 ripples maximum.

Figure 14:
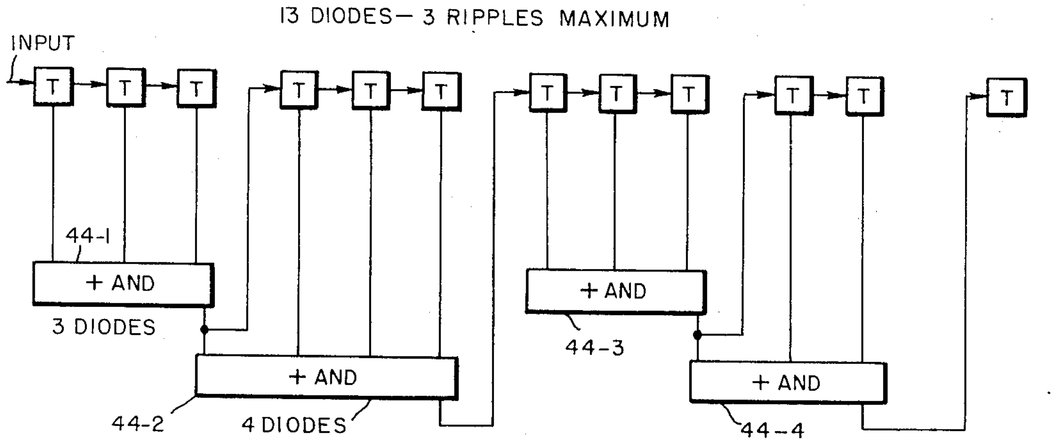
Fig. 14 is a block diagram of still further embodiment of the invention.

Referring to Fig. 14, this embodiment comprises a first group of three triggers controlling the "and" circuit 44—1, whose output feeds not only to the first trigger of the second group but also comprises the input to the fourth diode at the extreme left of the "and" circuit 44—2, whose other three diodes are conditioned by the three triggers of the second group. The output of the "and" circuit 44—2 is applied only to the first trigger of the third group whose "and" circuit 44—3 is conditioned solely by these three triggers. The output of "and" circuit 44—3 is fed not only to the first trigger of the fourth group but also comprises the input to the left hand diode of the "and" circuit 44—4 whose other two diodes are controlled by the triggers of the fourth group. The output of the "and" circuit 44—4 is fed to the single right hand trigger.

The operation of this embodiment is as follows:

At the end of the 7th pulse fed to the counter, the three triggers of the first group are all "on," thus conditioning the "and" circuit 44—1. The 8th input pulse produces a negative shift at the output of "and" circuit 44—1, to flip the first trigger of the second group. After 56 pulses, all three triggers of the second group are "on," thus applying +10 v. to the inputs of each of the three right hand diodes of the "and" circuit 44—2. After the 63rd input pulse, the three triggers of the first group are all "on," and the three triggers of the second group are unchanged, so that the "and" circuits 44—1 and 44—2 are conditioned. At the 64th pulse, a negative shift is available at the output of "and" circuit 44—2, to flip the first trigger of the third group. After the 448th pulse, the three triggers of the third group are all "on," thus conditioning the "and" circuit 44—3. At the 512th input pulse, a negative shift is available at the output of "and" circuit 44—3, to flip the first trigger of the fourth group. After 1536 pulses have been applied to the input of the counter, both triggers of the 4th group are "on," thus supplying +10 v. to each of the two right hand diodes of the "and" circuit 44—4. After 1984 pulses have been applied, the output of the "and" circuit 44—3 is +10 v. and since the "on" condition of the two triggers of the fourth group is unchanged, the "and" circuit 44—4 is conditioned. At the 2048th pulse, a negative shift is available at the output of "and" circuit 44—4, to flip the single trigger at the right.

Again assuming all triggers "on," a pulse supplied to the counter input will turn off the first trigger of the first group and by way of the "and" circuits 44—1 and 44—2 will turn off the first trigger of the third group and by way of the "and" circuits 44—3 and 44—4 will turn off the single trigger at the extreme right. Thus with 13 diodes employed in four "and" circuits, as illustrated in the embodiment of Fig. 14, a maximum time of 3 ripples only, is required to flip the last trigger and produce an output.

There have just been shown and described various embodiments of applicants' invention comprising circuits for reducing to a minimum the time required for ripple propagation through a counter circuit.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by scope of the following claims.

What is claimed is:

1. An electronic counter comprising a plurality of cascade connected bi-stable elements, means connecting said elements into a plurality of groups, each group comprising a plurality of cascade connected bi-stable elements, means supplying actuating input pulses to a first one of the bi-stable elements of a first one of said groups to alter its states of stability to produce operation of all the elements of said first group and means for eliminating the effect on said counter of the rippling time delay in the cascade operation of said bi-stable elements of said first group comprising an "and" circuit controlled by each one of all of the elements of said first group so that when each one of all said first group of elements, is in a similar state of stability, said "and" circuit is so conditioned, that upon application of the next actuating input pulse to said first one of said elements to alter its state of stability, said "and" circuit is de-conditioned to produce a change of energy at its output whereby upon application of said next actuating pulse to said one of the elements there is transmitted by said "and" circuit, to another of said groups, an actuating change of energy prior to cascade operation of the succeeding elements of said first group.

2. An electronic counter comprising a plurality of pulse operated cascade connected bi-stable elements, operable in groups, the elements, of each group, normally operable in cascade by actuating input energy changes applied to a first one of the cascade elements of each group to produce an output pulse, from one group to another group, and means for by-passing the rippling time delay in the cascade operation of the elements comprising one of said groups, said by-passing means comprising an "and" circuit, controlled by all the elements of the associated elements of said one group, so that when each one of all of said group elements is in a similar state of stability, said "and" circuit is so conditioned that upon application of the next actuating input energy change to said first one element of said one group to alter its condition of stability, a change in energy is produced at the output of said "and" circuit whereby there is transmitted, immediately, to another of said groups, an actuating change of energy, prior to cascade operation of the succeeding elements of said one group.

3. An electronic counter comprising a source of pulses to be applied to a first plurality of cascade-connected bi-stable devices each operable, by actuating changes of energy applied to the first device of said plurality, to different ones of conditions of stability, to indicate by the permutations of different stability conditions of said plurality, the number of pulses applied thereto, and means rendering ineffective the rippling time delay in the cascade operation of said devices comprising a coincidence circuit, conditioned by each one of all the bi-stable devices of said plurality upon assumption of the same condition of stability by each one of all said devices, a second plurality of cascade-connected devices, connected to the output of said coincidence circuit, said coincidence circuit being immediately operated, from said conditioned status to another status, to thus produce a change of energy at its output, by the next change of energy applied to said first one of said first plurality of devices to change its condition of stability to thereby produce stepping of said second cascade of devices prior to the rippling delayed operation of the succeeding devices of said first plurality upon said change in stability of said first one of said devices.

4. An electronic circuit comprising a plurality of cascade-connected bi-stable elements operable to either one of two sustained conditions of equilibrium, a source of pulses, means applying said pulses to the first one of said cascaded elements to step said elements to different permutations of said two sustained conditions, each permutation indicative of the number of pulses applied to said cascaded elements, and means by-passing the ripple time delay in the cascade operation of said elements comprising a coincidence circuit, conditioned by a chosen permutation of conditions of each one of all of said elements of said cascade, said coincidence circuit, being immediately actuated to a non-conditioned status, upon subsequent application of a pulse to said first one of said elements to change its condition of stability, to thereby produce an output change of energy from said coincidence circuit, prior to the rippling operation of succeeding elements of said plurality produced by said change of condition of said first cascaded element, and a bi-stable element, operable to either of two sustained conditions, connected to the output of said coincidence circuit, for operation by said output pulse, prior to rippling operation of the succeeding elements of said plurality.

5. An electronic counter comprising a plurality of cascade-connected electronic trigger elements operable to permutations of "on" and "off" conditions of the respective triggers by pulses applied to the first trigger of said cascade, a first coincidence circuit connected to each one of all of said triggers and conditioned, to a threshold status, upon assumption of a chosen permutation by said triggers assumed after application of a certain number of pulses to said first trigger, and operable, to change from said threshold status, to thus immediately produce an output change of energy, only upon a change in status of said first trigger, produced upon application, of the next pulse, to said first trigger, to thereby by-pass the ripple operation of the succeeding triggers of said cascade, a second plurality of cascade-connected electronic triggers and a second similar coincidence circuit connected to said second plurality and operative to by-pass the ripple operation of said second plurality of triggers, means connecting the output of said first coincidence circuit and said second plurality of triggers, a third plurality of triggers and a similar coincidence circuit connected to said third plurality and operative to by-pass the ripple operation of said third plurality of cascaded triggers, means connecting the output of said second coincidence circuit and said third plurality of triggers and a fourth plurality operable by the output of said last coincidence circuit.

6. An electronic counter comprising a plurality of cascade-connected electronic trigger elements operable to permutations of "on" and "off" conditions of the respective triggers by pulses applied to the first trigger of said cascade, a first coincidence circuit connected to each of said triggers and conditioned, to a threshold status, upon assumption of a chosen permutation of "on" and "off" conditions by said triggers, assumed after application of a certain number of pulses to said first trigger and operable to change, from said threshold status, to thus immediately produce an output change of energy, only upon a change in status of said first trigger, produced upon application of the next pulse to said first trigger, a second plurality of cascade-connected trigger elements, a second coincidence circuit connected to each of the triggers of said second plurality, and said first coincidence circuit being directly connected, to one of said second plurality of trigger elements and to said second coincidence circuit.

7. A device as in claim 6 and including a third plurality of trigger elements, a third coincidence circuit connected to each of the triggers of said third plurality, said third plurality being connected to the output of said second coincidence circuit, a fourth plurality of cascade-connected trigger elements connected to the output of said third coincidence circuit, and a fourth coincidence circuit, connected to each of the trigger elements of said fourth plurality, and said third coincidence circuit being directly connected to both, one of the triggers of said fourth plurality and to said fourth coincidence circuit.

8. An electronic counter comprising a plurality of cascade-connected bi-stable elements, means for operating said elements in cascade comprising a source of actuating pulses applied to the first one of said elements of said cascade, a coincidence circuit connected to each of said elements, said coincidence circuit being conditioned to one status, by each one of all of said elements when each one is in a similar condition of stability produced by said actuating pulses operating said first element and said coincidence circuit being immediately operated to another status, to produce a change of energy at its output, upon application of the next actuating pulse to said first one element, a second plurality of elements, a second coincidence circuit similarly connected to each of the elements thereof, and said first coincidence circuit being directly connected to both, the first element of said second plurality and to said second coincidence circuit, to thus apply an actuating pulse to the first element of said second plurality or a conditioning energy output to said second coincidence circuit, and a third plurality of elements, a third coincidence circuit, similarly connected to each of the elements thereof, and said second coincidence circuit being directly connected to both, said third plurality and to said third coincidence circuit whereby the loss of time due to rippling operation of all said pluralities is greatly reduced.

9. A high speed counter comprising a plurality of cascade-connected bi-stable elements, the elements of such plurality being divided into groups, each operable in cascade, by actuating pulses applied to the first one respectively of each of the cascade-connected elements and means for rendering ineffective, the rippling among directly cascade-connected elements of the respective groups, and thus reducing the loss of time in operation due to rippling of the cascaded elements of all said groups to thereby increase the speed of operation of said counter, said means comprising a plurality of "and" circuits, each such "and" circuit comprising a plurality of diodes each diode having one side thereof connectible to an associated respective element and the other sides all joined to the output of said "and" circuit, each and every one of the cascaded elements of a certain group being connected to the respective diodes of its associated "and" circuit, each such "and" circuit being conditioned, to one status, by the assumption of similar stable conditions of each and every one of the elements of its associated group, by operation of the first element of said cascade by said actuating pulses, whereby said one side of each diode respectively of said "and" circuit is similarly conditioned to produce a conditioning output from said "and" circuit upon assumption of said one status and said "and" circuit being immediately operated to a different status, to produce an energy changing output, upon the application of the next actuating pulse to said first element of said associated cascade and prior to the rippling operation of succeeding elements of said cascade, whereby the effect of rippling in said entire counter, is reduced in proportion to the increase in the total number of diodes of the respective "and" circuits interconnected respectively among the several groups.

References Cited in the file of this patent

UNITED STATES PATENTS

| | | |
|---|---|---|
| 2,500,294 | Phelps | Mar. 14, 1950 |
| 2,527,633 | Grignon | Oct. 31, 1950 |
| 2,563,841 | Jensen | Aug. 14, 1951 |
| 2,621,854 | Sprague | Dec. 16, 1952 |

OTHER REFERENCES

"Third Interim Progress Report," Institute for Advanced Study, Princeton, N. J., January 1948, page 129.